United States Patent
Wang

(10) Patent No.: US 11,880,205 B2
(45) Date of Patent: Jan. 23, 2024

(54) AUTO CLEAN MACHINE AND AUTO CLEAN MACHINE CONTROL METHOD

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/968,810

(22) Filed: Oct. 19, 2022

(65) Prior Publication Data

US 2023/0038723 A1 Feb. 9, 2023

Related U.S. Application Data

(63) Continuation of application No. 15/889,127, filed on Feb. 5, 2018, now Pat. No. 11,507,097.

(51) Int. Cl.
| | |
|---|---|
| G05D 1/02 | (2020.01) |
| G05D 1/00 | (2006.01) |
| A47L 11/40 | (2006.01) |
| G01C 3/08 | (2006.01) |
| G01C 5/00 | (2006.01) |

(52) U.S. Cl.
CPC ........ *G05D 1/0214* (2013.01); *A47L 11/4011* (2013.01); *A47L 11/4061* (2013.01); *G05D 1/0088* (2013.01); *G05D 1/0231* (2013.01); *A47L 2201/04* (2013.01); *G01C 3/08* (2013.01); *G01C 5/00* (2013.01); *G05D 2201/0203* (2013.01)

(58) Field of Classification Search
CPC .................................................. G06V 20/10
See application file for complete search history.

(56) References Cited

U.S. PATENT DOCUMENTS

| | | | |
|---|---|---|---|
| 6,320,618 | B1 | 11/2001 | Aoyama |
| 10,420,448 | B2 | 9/2019 | Nam |
| 2002/0030808 | A1 | 3/2002 | Bostrom |
| 2005/0151863 | A1 | 7/2005 | Johannesson |
| 2015/0339825 | A1 | 11/2015 | Muramatsu |
| 2017/0332853 | A1 | 11/2017 | Nam |
| 2017/0332866 | A1* | 11/2017 | Nam ................... A47L 11/4013 |
| 2017/0332871 | A1 | 11/2017 | Sung |

(Continued)

FOREIGN PATENT DOCUMENTS

| | | |
|---|---|---|
| EP | 3 547 678 A1 | 10/2019 |
| WO | 2009/145805 A1 | 12/2009 |

*Primary Examiner* — Peter D Nolan
*Assistant Examiner* — Michael F Whalen
(74) *Attorney, Agent, or Firm* — Winston Hsu

(57) ABSTRACT

An auto clean machine, comprising: a light source configured to emit light to illuminate at least one light region outside and in front of the auto clean machine; a first image sensing area, configured to sense a first brightness distribution of the light region; a second image sensing area below the first image sensing area, configured to sense a second brightness distribution of the light region; and a processor, configured to control movement of the auto clean machine according the first brightness distribution and the second brightness distribution. The processor generates a wall detection result based on the first brightness distribution of the light region, generates a cliff detection result based on the second brightness distribution of the light region, and controls the movement of the auto clean machine according to the wall detection result and the cliff detection result.

12 Claims, 8 Drawing Sheets

(56) References Cited

U.S. PATENT DOCUMENTS

| | | |
|---|---|---|
| 2019/0079531 A1 | 3/2019 | Haegermarck |
| 2019/0191064 A1 | 6/2019 | Aihara |
| 2019/0305018 A1 | 10/2019 | Price |
| 2020/0049825 A1* | 2/2020 | Wang ..................... G01S 17/48 |

\* cited by examiner

AUTO CLEAN MACHINE AND AUTO CLEAN MACHINE CONTROL METHOD

CROSS REFERENCE TO RELATED APPLICATIONS

This application is a continuation application of U.S. application Ser. No. 15/889,127, filed on Feb. 5, 2018. The content of the application is incorporated herein by reference.

BACKGROUND OF THE INVENTION

1. Field of the Invention

The present invention relates to an auto clean machine and an auto clean machine control method, and particularly relates to an auto clean machine and an auto clean machine control method which can detect a wall, an object height or a cliff.

2. Description of the Prior Art

A conventional auto clean machine (ex. a sweep robot) always employs a light source below the machine to detect a cliff. FIG. 1 is a schematic diagram illustrating a conventional auto clean machine. As illustrated in FIG. 1, the auto clean machine 100 comprises a light source 101 configured to emit light to a ground, and comprises an image sensor 103 to detect reflected light reflected from the ground. Accordingly, if a cliff 105 is below the auto clean machine 100, a brightness value of the reflected light for the light from the light source 101 greatly decreases, such that the auto clean machine 100 can determine existence of the cliff 105.

However, such determining method has some disadvantages. For example, at least part of the auto clean machine 100 must protrude from the cliff 105, or the brightness value of the reflected light does not decrease and the auto clean machine 100 could not determine existence of the cliff 105. However, the auto clean machine 100 may drop down if a part of the auto clean machine 100 protrudes from the cliff 105. Besides, the auto clean machine 100 could not determine the existence of the cliff 105 until the cliff 105 is already below the auto clean machine 100. Accordingly, the auto clean machine 100 may drop down if it could not stop in time.

SUMMARY OF THE INVENTION

One objective of the present invention is to provide a control apparatus for an auto clean machine and an auto clean machine control method which can detect a cliff even if the auto clean machine is still far away from the cliff.

Another objective of the present invention is to provide a control apparatus for an auto clean machine and an auto clean machine control method which can detect a wall or an object height.

One embodiment of the present invention discloses an auto clean machine, comprising: a light source configured to emit light to illuminate at least one light region outside and in front of the auto clean machine; a first image sensing area, configured to sense a first brightness distribution of the light region; a second image sensing area below the first image sensing area, configured to sense a second brightness distribution of the light region; and a processor, configured to control movement of the auto clean machine according the first brightness distribution and the second brightness distribution. The processor generates a wall detection result based on the first brightness distribution of the light region, generates a cliff detection result based on the second brightness distribution of the light region, and controls the movement of the auto clean machine according to the wall detection result and the cliff detection result.

Another embodiment of the present invention discloses an auto clean machine control method, which comprises: an auto clean machine control method, comprising: emitting light to illuminate at least one light region outside and in front of the auto clean machine; sensing a first brightness distribution of the light region by a first image sensing area; sensing a second brightness distribution of the light region by a second image sensing area below the first image sensing area; controlling movement of the auto clean machine according the first brightness distribution and the second brightness distribution; generating a wall detection result based on the first brightness distribution of the light region; and generating a cliff detection result based on the second brightness distribution of the light region; and controlling the movement of the auto clean machine according to the wall detection result and the cliff detection result.

Based upon above-mentioned embodiments, the cliff can be detected while the auto clean machine is far away from the cliff, thus the issue for the conventional auto clean machine can be solved. Additionally, the mechanism provided by the present invention can be employed to detect a wall or an object height, which is helpful for the auto clean machine to avoid collision.

These and other objectives of the present invention will no doubt become obvious to those of ordinary skill in the art after reading the following detailed description of the preferred embodiment that is illustrated in the various figures and drawings.

DETAILED DESCRIPTION

Following embodiment(s) of the present invention can be realized by a computer of a system or apparatus that reads out and executes computer executable instructions (e.g., one or more programs) recorded on a storage medium (which may also be referred to more fully as a non-transitory computer-readable storage medium) to perform the functions of one or more of the following embodiment (s) and/or that includes one or more circuits (e.g., application specific integrated circuit (ASIC)) for performing the functions of one or more of the following embodiment(s). The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Figure 1:
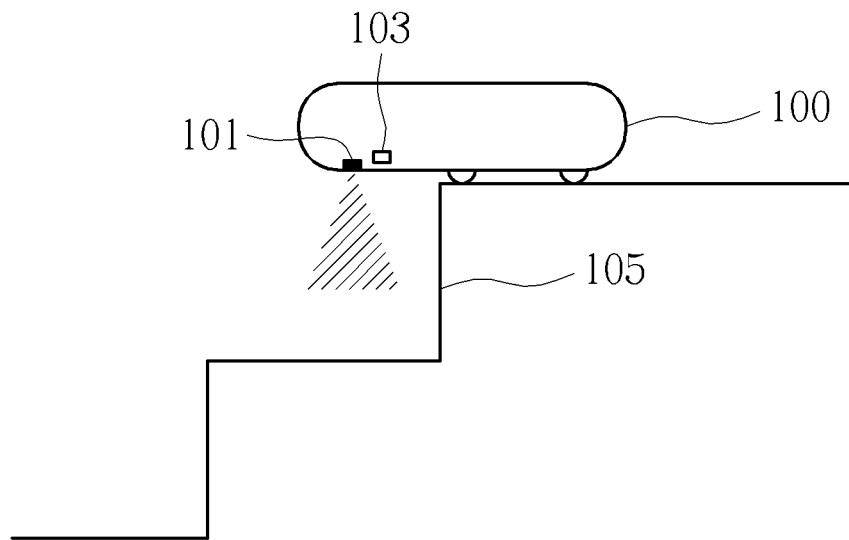
FIG. 1 is a schematic diagram illustrating a conventional auto clean machine.
Figure 2:
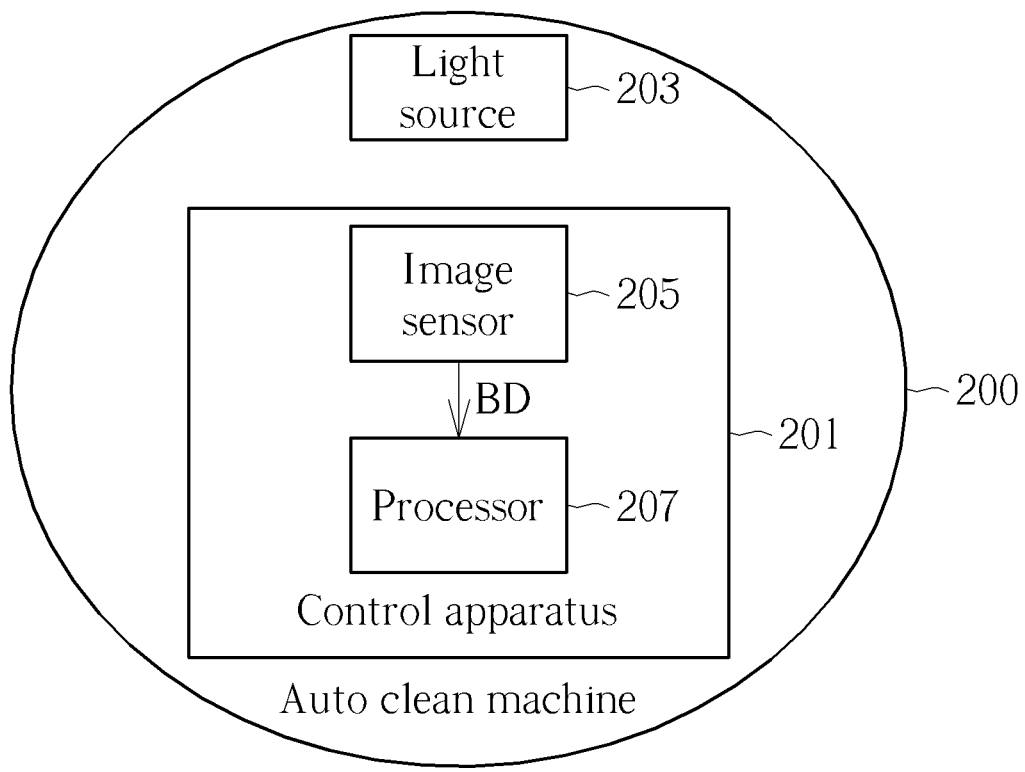
FIG. 2 is a block diagram illustrating an auto clean machine comprising a control apparatus according to one embodiment of the present invention.

FIG. 2 is a block diagram illustrating an auto clean machine comprising a control apparatus according to one embodiment of the present invention. As illustrated in FIG. 2, the auto clean machine 200 comprises a control apparatus 201 and a light source 203. The control apparatus 201 comprises an image sensor 205 and a processor 207. The light source 203 is configured to emit light to illuminate a light region outside and in front of the auto clean machine 100. In one embodiment, the light source 203 is a line light source, which can emit light in a line shape with a narrow width or a wide width. The image sensor 205 is configured to sense brightness distribution BD of the light region. The brightness distribution BD can be, for example, a length of the light region, or an image centroid of the light region, or lengths of light regions. The processor 207 is configured to control movement of the auto clean machine 100 according the brightness distribution BD.

Figure 3:
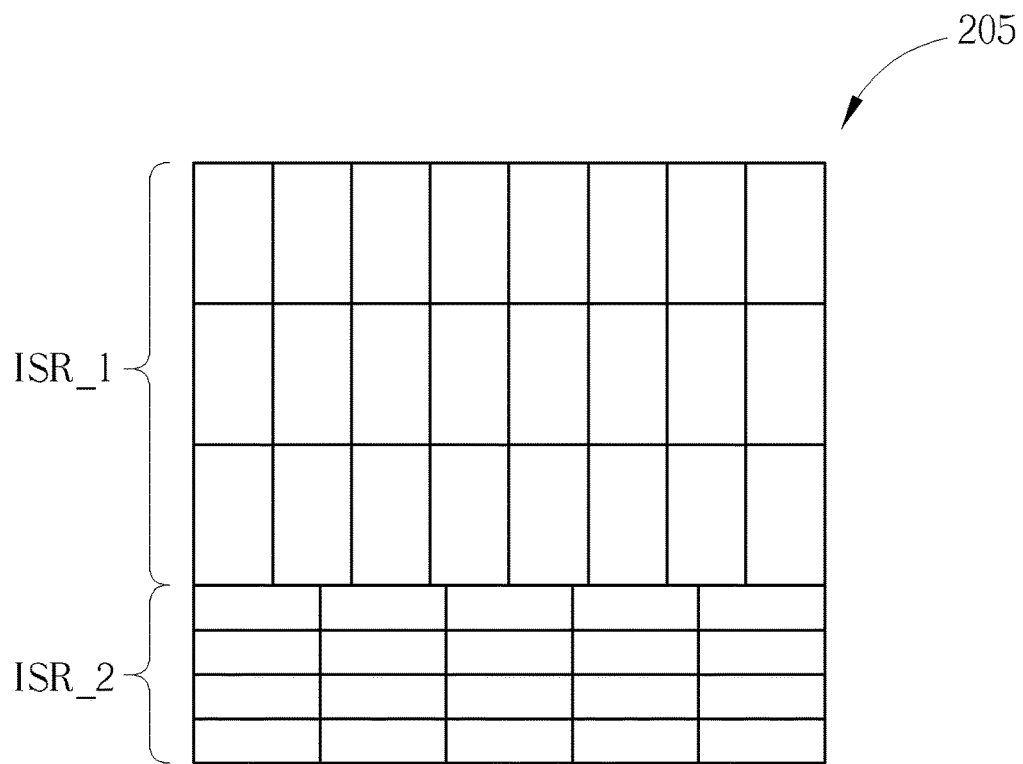
FIG. 3 is a schematic diagram illustrating an image sensor according to one embodiment of the present invention.

FIG. 3 is a schematic diagram illustrating an image sensor according to one embodiment of the present invention. As illustrated in FIG. 3, the image sensor 205 comprises an image sensing area ISR_1 and an image sensing area ISR_2. Each of the image sensing areas ISR_1 and ISR_2 has different resolutions for different directions. For example, the resolution for the horizontal direction of the image sensing area ISR_1 is higher than the resolution for the vertical direction of the image sensing area ISR_1. On the opposite, the resolution for the vertical direction of the image sensing area ISR_2 is higher than the resolution for the horizontal direction of the image sensing area ISR_2.

The resolution indicates the sensitivity for the image sensing areas ISR_1, ISR_2. For example, the image sensing area ISR_1 is more sensitive for the brightness variation in the horizontal direction than in the vertical direction. On the opposite, the image sensing area ISR_2 is more sensitive for the brightness variation in the vertical direction than in the horizontal direction.

In other words, the resolution is related with the density of image sensing units such as pixels. For example, the density for image sensing units for the horizontal direction of the image sensing area ISR_1 is higher than the density for image sensing units for the vertical direction of the image sensing area ISR_1.

Please note, the image sensing area ISR_1 and the image sensing area ISR_2 are not limited to be provided in a single image sensor. The image sensing area ISR_1 and the image sensing area ISR_2 can be provided to two independent image sensors rather in a single image sensor. The functions for the image sensing area ISR_1 and the image sensing area ISR_2 will be described later. Also, following embodiments are not limited to be implemented by the image sensor 205 illustrated in FIG. 3.

Several embodiments are provided in following descriptions to explain the concept of the present invention. It will be appreciated that some components of the auto clean machine 200 are not illustrated in following embodiments, for the convenience of explaining.

Figure 4:
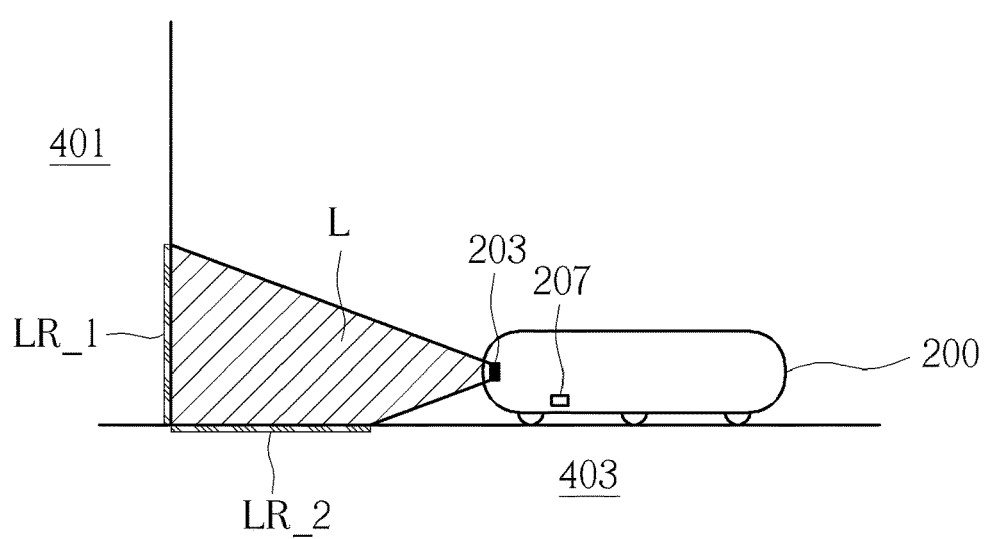
FIG. 4 is a schematic diagram illustrating the auto clean machine emits light to a wall and a ground, to detect the wall.
Figure 5:
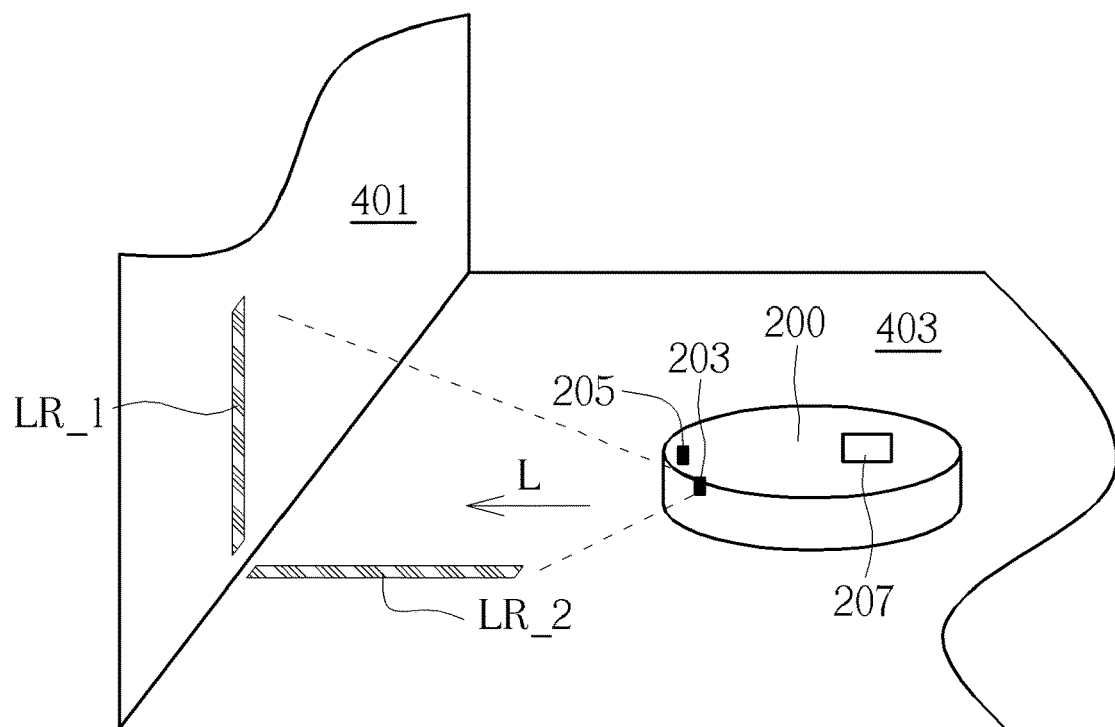
FIG. 5 is a schematic diagram illustrating the auto clean machine emits light to a wall and a ground, in a 3D view.

The above-mentioned image sensing area ISR_1 can be employed to implement the embodiments illustrated in FIG. 4-FIG. 12. As illustrated in FIG. 4, the light source 203 in the auto clean machine 200 emits light L to a wall 401 and a ground 403, to generate a light region comprising a light region LR_1 on the wall 401 and a light region LR_2 on the ground 403. FIG. 5 is a schematic diagram illustrating a 3D view diagram for FIG. 4. Based on FIG. 4 and FIG. 5, the relations between the light regions LR_1, LR_2, the wall 401, the ground 403 and the auto clean machine 200 can be clearly understood. The processor 207 generates a wall detection result based on the brightness distribution of the light regions LR_1, LR_2, and controls the movement of the auto clean machine 200 according to the wall detection result.

Figure 6:
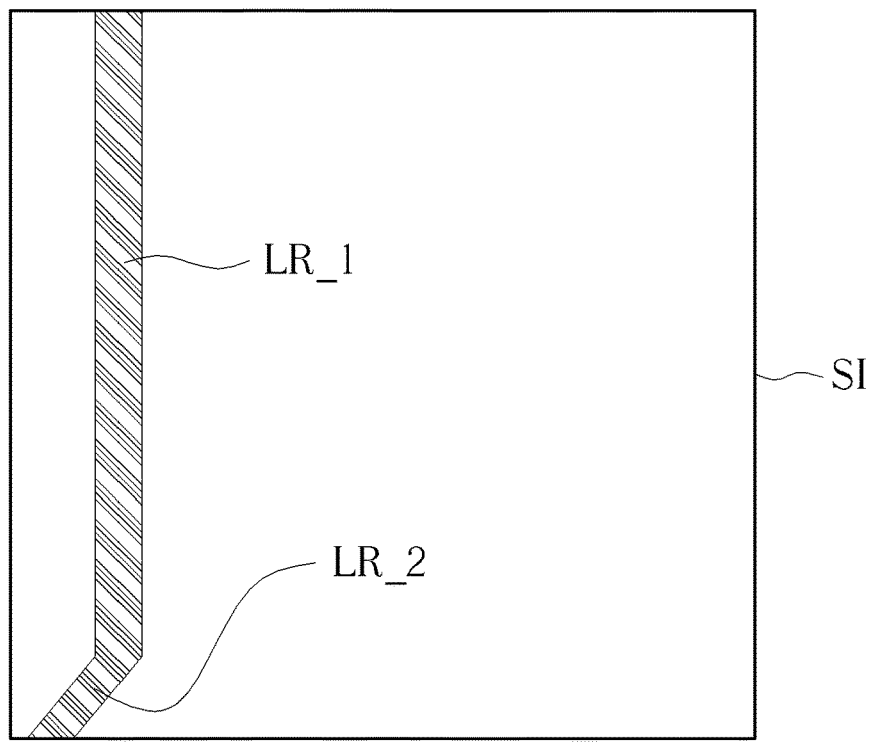
FIG. 6 is a schematic diagram illustrating an example for a sensing image comprising the light region.

FIG. 6 is a schematic diagram illustrating an example for a sensing image comprising the light region. As illustrated in FIG. 6, the sensing image SI captured by the image sensor 205 comprises the images for the light regions LR_1, LR_2, thus the location and the length of the light regions LR_1, LR_2 can be identified via the sensing image SI. Please note, since the image sensor 205 is not provided at the emitting direction of the light source 203, the images for the light regions LR_1, LR_2 are shifted and not at the center of the sensing image SI if the auto clean machine 200 is close to the wall 401. The lengths or the locations of the light regions LR_1, LR_2 may change corresponding to a distance between the auto clean machine 200 and the wall 401, which will be depicted in more detail later.

Figure 7:
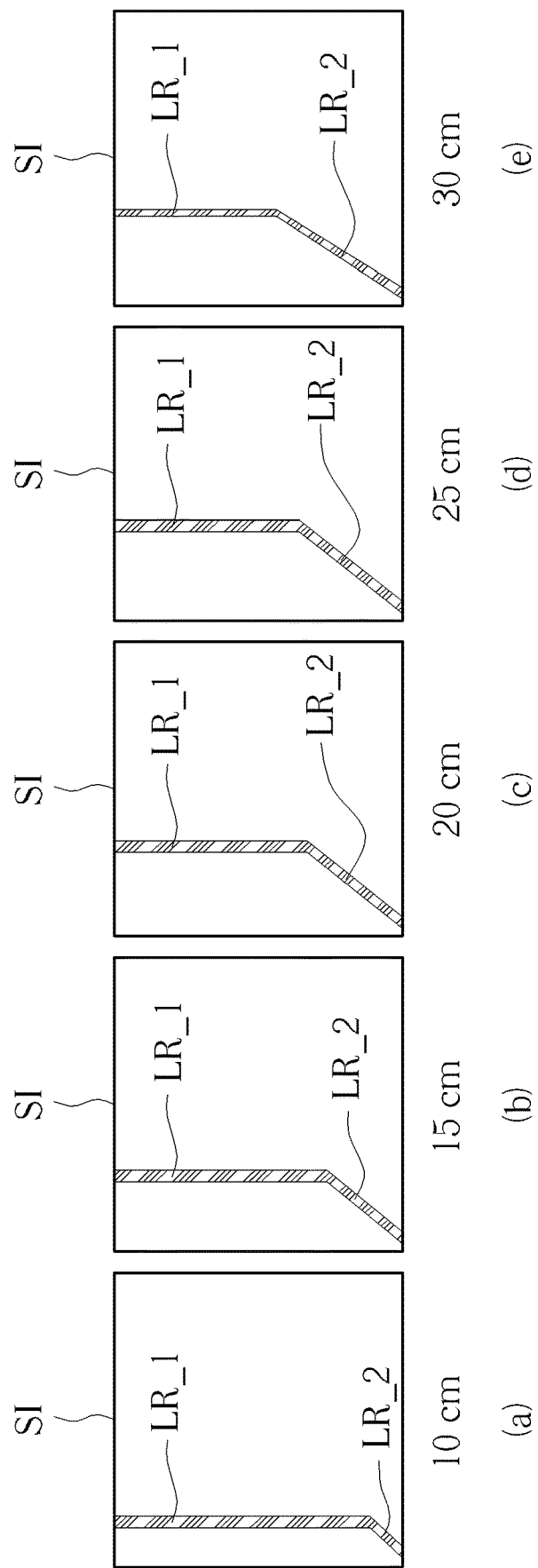
FIG. 7 is a schematic diagram illustrating the variations for the light region corresponding to a distance between the wall and the auto clean machine.

FIG. 7 is a schematic diagram illustrating the variations for the light region corresponding to a distance between the wall and the auto clean machine. FIG. 7 comprises sub-diagrams (a)-(e), and the exemplary distances between the auto clean machine 200 and the wall 401 are respectively 10 cm, 15 cm, 20 cm, 25 cm and 30 cm for the sub-diagrams (a)-(e). As illustrated in FIG. 7, if the auto clean machine 200 is closer to the wall 401 such as the sub-diagram (a), the length of the light region LR_1 is longer and the length of the light region LR_2 is shorter, and the location of the light region LR_1 is farer from the center. On the contrary, if the auto clean machine 200 is farer from the wall 401 such as the sub-diagram (e), the length of the light region LR_1 is shorter and the length of the light region LR_2 is longer, and the location of the light region LR_1 is closer to the center. Therefore, the processor 207 can generate a wall detection result (ex. determine a distance between the wall and the auto clean machine) based on a ratio between the lengths for the light region LR_1 and the light region LR_2, or based on the image centroid for the light regions LR_1 and LR_2. Please note, as known by persons skilled in the art, the image centroid changes if the brightness of the image changes. Therefore, if the location or the length of the light regions LR_1 and LR_2 changes, the image centroid correspondingly changes. Accordingly, the processor 207 can generate a wall detection result based on the image centroid for the light regions LR_1 and LR_2.

Figure 8:
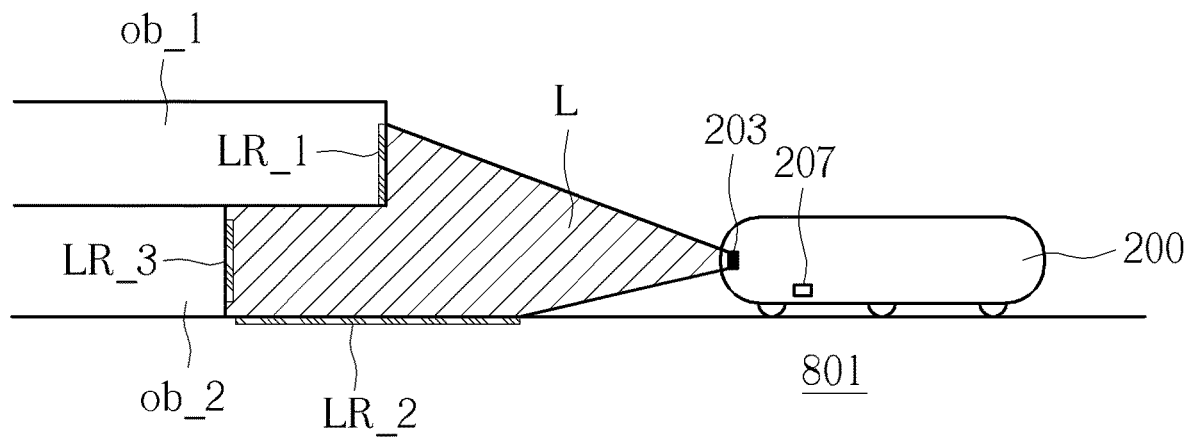
FIG. 8 is a schematic diagram illustrating the auto clean machine emits light to an object, according to one embodiment of the present invention, to detect an object height.
Figure 9:
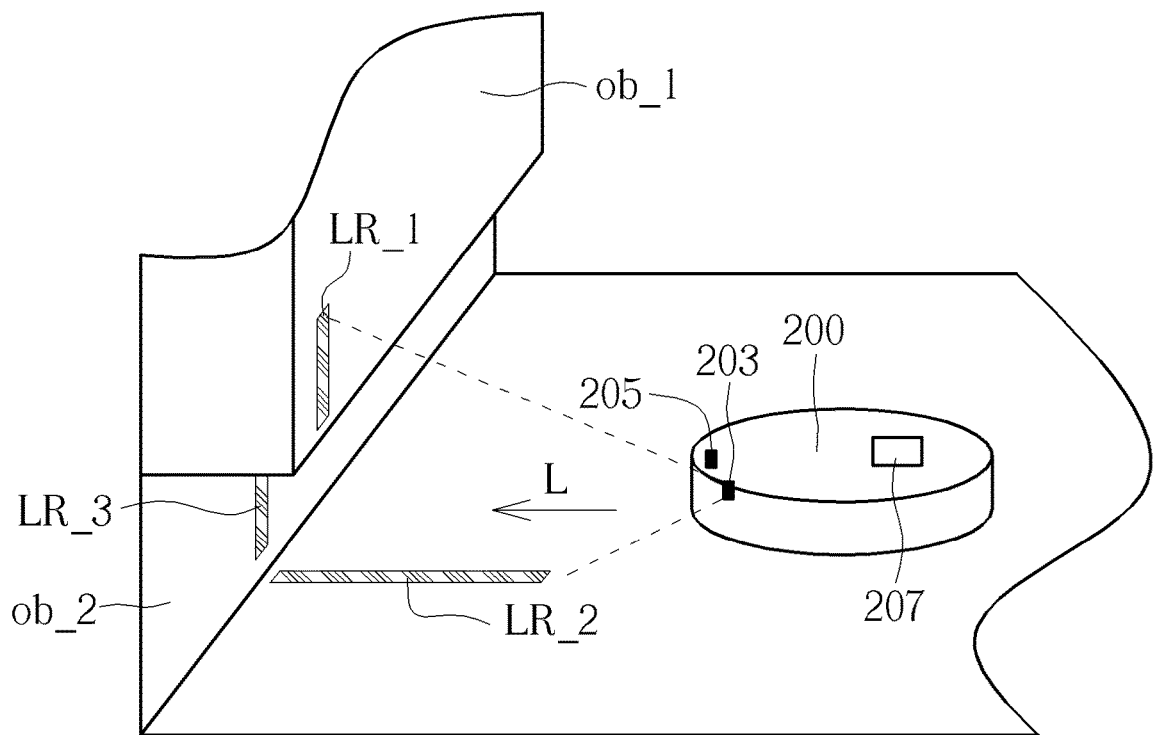
FIG. 9 is a schematic diagram illustrating the auto clean machine emits light to an object, in a 3D view.

In the embodiment of FIG. 8, the light source 203 in the auto clean machine 200 emits light L to an object ob_1, an object ob_2 below the object ob_1, and a ground 801, such that a light region LR_1, a light region LR_2 and a light region LR_3 are generated. FIG. 9 is a schematic diagram illustrating a 3D view diagram of FIG. 8. Based on FIG. 8 and FIG. 9, the relations between the light regions LR_1, LR_2, LR_2, objects Ob_1, Ob_2 and the auto clean machine 200 can be clearly understood.

For the embodiments illustrated in FIG. 8 and FIG. 9, the processor 207 generates an object height detection result based on the brightness distribution of the light region LR_1, LR_2 and LR_3, and controls the movement of the auto clean machine 200 according to the object height detection result. For example, the processor 207 detects an object height (a distance between the object ob_1 and the ground 801) for the object ob_1, and stops the auto clean machine 200 if the object height is too small. Please note the object ob_1, and the object ob_2 can form a single object, such as a sofa or a coffee table, rather than limited to two independent objects.

Figure 10:
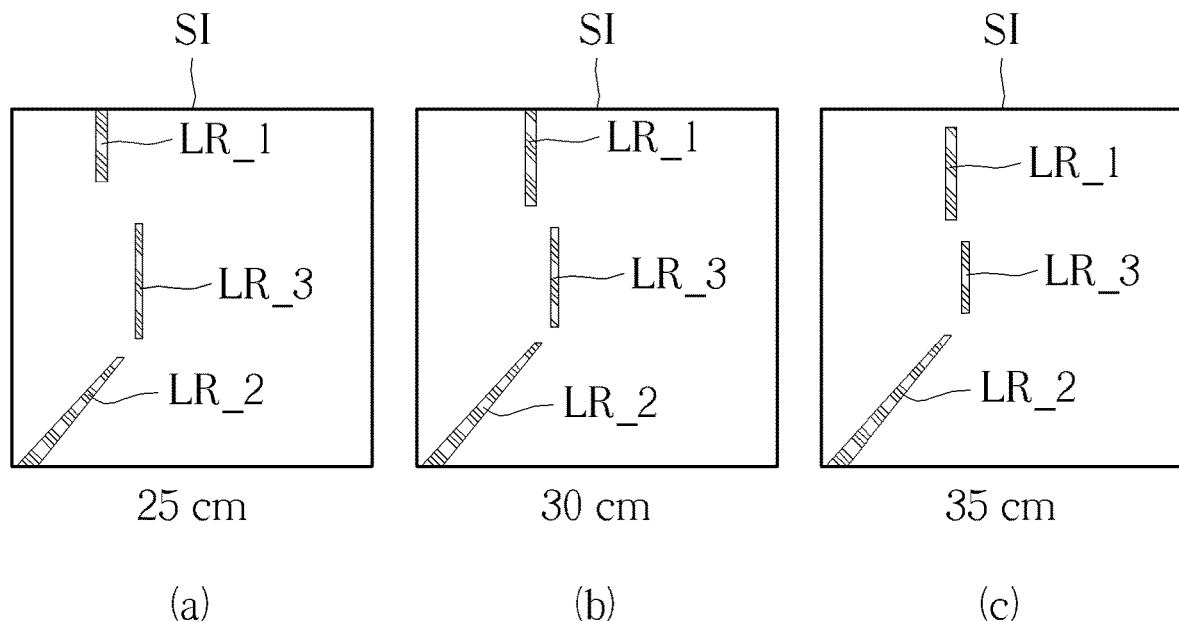
FIG. 10 is a schematic diagram illustrating the variations for the light region corresponding to a distance between the object and the auto clean machine.

FIG. 10 is a schematic diagram illustrating the variations for the light region corresponding to a distance between the object and the auto clean machine. Similarly, since the image sensor 205 is not provided at the emitting direction of the light source 203, the images for the light regions LR_1, LR_2, LR_3 are shifted and not at the center of the sensing image SI if the auto clean machine 200 is close to the objects ob_1, ob_2. The lengths or the locations of the light regions LR_1, LR_2, LR_3 may change corresponding to a distance between the auto clean machine 200 and the objects ob_1, ob_2, which will be depicted in more detail later.

As illustrated in FIG. 10, the light region LR_2 is perpendicular to an extension region of the light region LR_1, and the light region LR_3 is parallel with the extension region of the light region LR_1. FIG. 10 comprises sub-diagrams (a)-(c), and the exemplary distances between the auto clean machine 200 and the object ob_2 are respectively 25 cm, 30 cm and 35 cm for the sub-diagrams (a)-(c). As illustrated in FIG. 10, if the auto clean machine 200 is closer to the object ob_2, the lengths of the light regions LR_1, LR_2 does not change or slightly changes, but the length of the light region LR_3 greatly changes. Accordingly, the processor 207 can generate the object height detection result according to a length of the light region LR_3. In one embodiment, the processor 207 can map the length of the light region LR_3 to an object height based on a mapping table. For example, if the length of the light region LR_3 is x cm and the length of the light region LR_2 is y cm, than the processor 207 can determine the object is z cm based on the mapping table and/or the length of the light region LR_2. In embodiment, the processor 207 stops the auto clean machine 200 while the distance between the distance between auto clean machine 200 and the object ob_2 approaches a threshold distance if the object height is smaller than the width of the auto clean machine 200.

Figure 11:
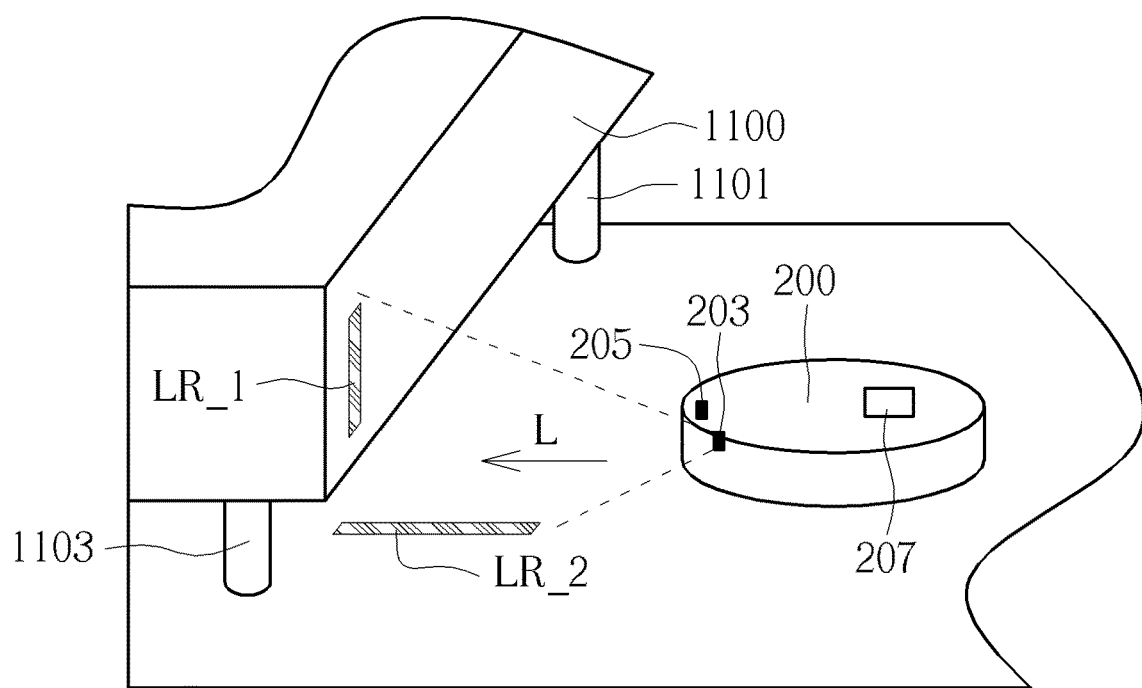
FIG. 11 is a schematic diagram illustrating the auto clean machine emits light to an object, according to another embodiment of the present invention.
Figure 12:
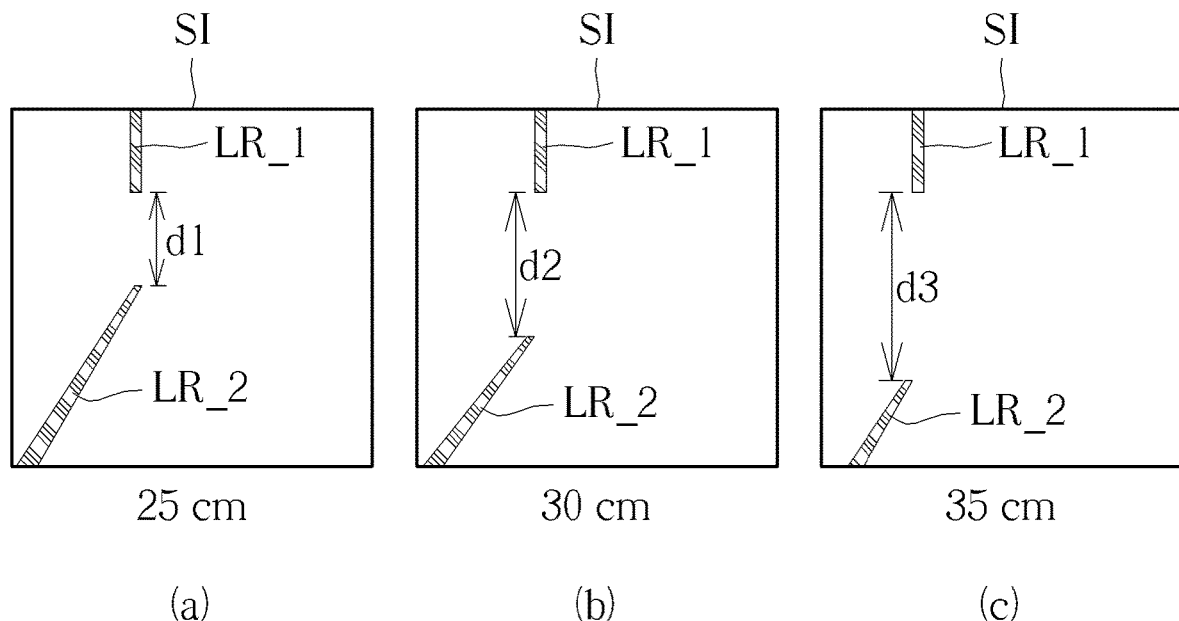
FIG. 12 is a schematic diagram illustrating the variations for the light region corresponding to a distance between the object and the auto clean machine, for the embodiment illustrated in FIG. 11.

In another embodiment, a lower part of the object is empty rather than having another object. As illustrated in FIG. 11, the table 1101 are supported by table legs 1101, 1103 and has no drawers, thus the lower part of the table 1101 is empty. In such embodiments, the above-mentioned light region LR_3 becomes a dark region, as illustrated in FIG. 12. As illustrated in FIG. 12, the light region LR_3 becomes a dark region, thus the processor 207 generates the object height detection result according to a length for a dark region (ex. d1, d2, d3 in FIG. 12) between the light region LR_1 and the light region LR_2.

Figure 13:
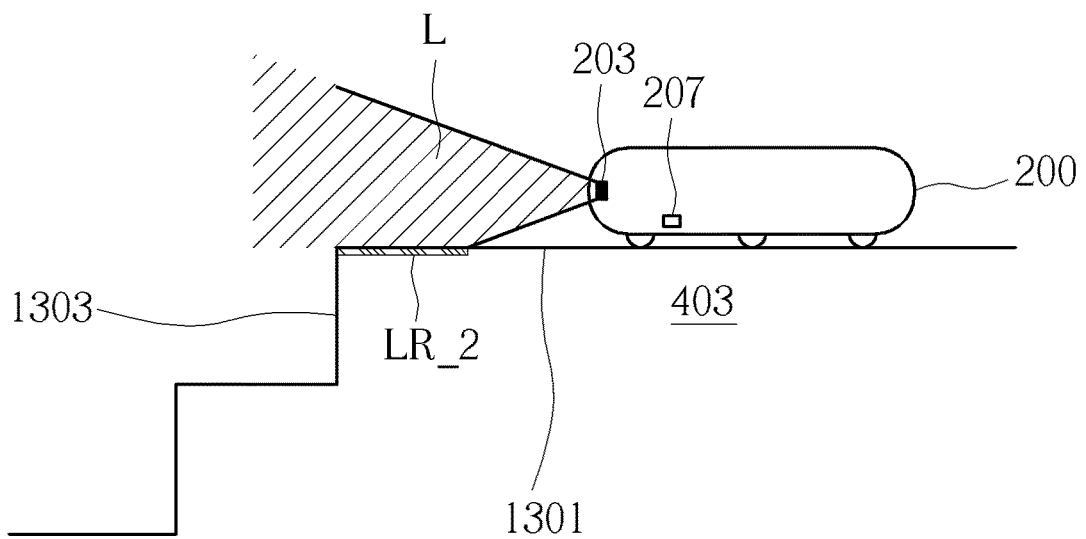
FIG. 13 is a schematic diagram illustrating the auto clean machine emits light to detect a cliff.
Figure 14:
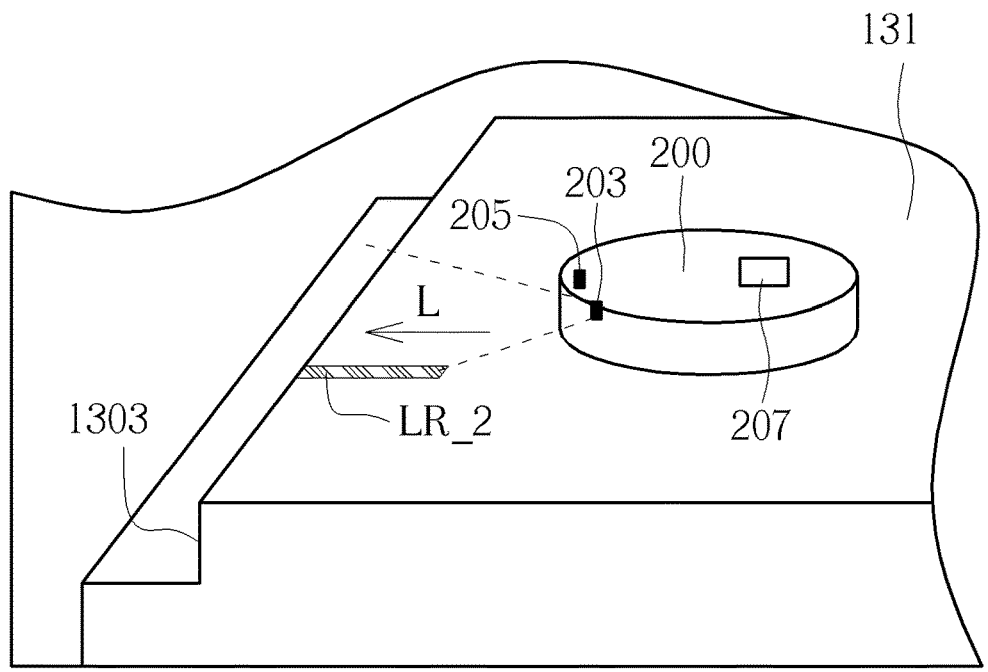
FIG. 14 is a schematic diagram illustrating the auto clean machine emits light to detect a cliff, in a 3D view.
Figure 15:
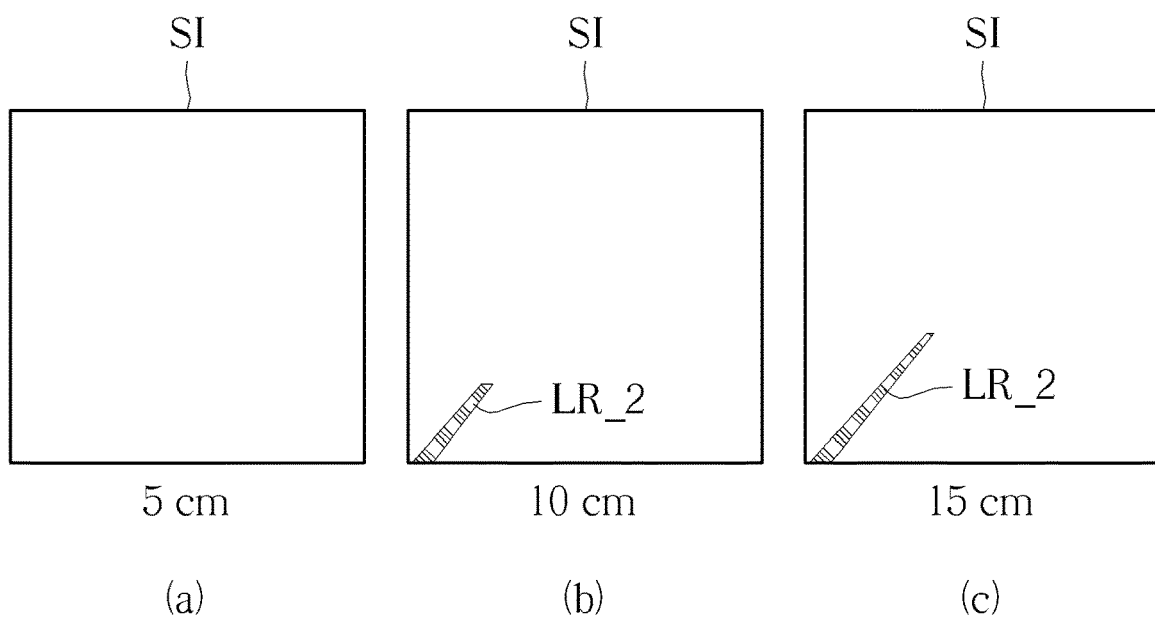
FIG. 15 is a schematic diagram illustrating the variations for the light region corresponding to a distance between a cliff and the auto clean machine.

The above-mentioned image sensing area ISR_2 can be applied to implement the embodiments illustrated in FIG. 13-15. FIG. 13 is a schematic diagram illustrating the auto clean machine emits light to detect a cliff. In the embodiment of FIG. 13, the auto clean machine 200 is approaching stairs, and the light source 203 emits light to a ground 1301 perpendicular to a cliff 1303 of the stair, to generate a light region LR_2. FIG. 14 is a schematic diagram illustrating a 3D view diagram for FIG. 13. Based on FIG. 13 and FIG. 14, the relations between the light region LR_2, the cliff 1303 and the auto clean machine 200 can be clearly understood. The processor 207 generates a cliff detection result based on the brightness distribution of the light region LR_2, and controls the movement of the auto clean machine according to the cliff detection result. For example, if the auto clean machine 200 is close to a cliff, it is stopped.

FIG. 15 is a schematic diagram illustrating the variations for the light region corresponding to a distance between a cliff and the auto clean machine. FIG. 15 comprises sub-diagrams (a)-(c), and the exemplary distances between the auto clean machine 200 and the cliff 1303 are respectively 5 cm, 10 cm, and 15 cm for the sub-diagrams (a)-(c). As illustrated in FIG. 15, if the auto clean machine 200 is closer to the cliff 1303 such as sub-diagrams (a), (b), the length of the light region LR_2 is shorter, or even no light region LR_2 exists. On the contrary, if the auto clean machine 200 is farer from the cliff 1303 such as sub-diagram (c), the length of the light region LR_2 is longer. Therefore, the processor 207 can generate a cliff detection result (ex. determine a distance between the cliff 1303 and the auto clean machine 200) based on a length of the light region LR_2. In one embodiment, the processor 207 stops the auto clean machine 200 if a length of the light region is smaller than a threshold length, which means the auto clean machine 200 is close to the cliff 1303.

Please note, the above-mentioned embodiments for the light regions are only for examples and do not mean to limit the scope of the present invention. The lengths, the locations or the numbers of the light regions may change corresponding to a location of the light source, a location of the image sensor, and a structure for the target to be illuminated (ex. the tilting angle of the wall).

In view of above-mentioned embodiments, an auto clean machine control method can be acquired, which comprises the steps of: emitting light to illuminate a light region outside and in front of the auto clean machine (ex. via the light source 203 in FIG. 2); sensing a first brightness distribution of the light region (ex. via the image sensor 205 in FIG. 2); and control movement of the auto clean machine according the first brightness distribution (ex. via the processor 207 in FIG. 2).

Based upon above-mentioned embodiments, the cliff can be detected while the auto clean machine is far away from the cliff, thus the issue for the conventional auto clean machine can be solved. Additionally, the mechanism provided by the present invention can be employed to detect a wall or an object height, which is helpful for the auto clean machine to avoid collision.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto clean machine, comprising:
   a light source configured to emit light to illuminate at least one light region;
   a first image sensing area, configured to sense a first brightness distribution of the light region, wherein a resolution for a horizontal direction of the first image sensing area is higher than a resolution for a vertical direction of the first image sensing area;
   a second image sensing area below the first image sensing area, configured to sense a second brightness distribution of the light region, wherein a resolution for a vertical direction of the second image sensing area is higher than a resolution for a horizontal direction of the second image sensing area; and
   a processor, configured to control movement of the auto clean machine according the first brightness distribution and the second brightness distribution;
   wherein the processor generates a wall detection result based on the first brightness distribution of the light region, generates a cliff detection result based on the second brightness distribution of the light region, and controls the movement of the auto clean machine according to the wall detection result and the cliff detection result.

2. The auto clean machine of claim 1, wherein the first brightness distribution is a length of the light region or an image centroid of the light region.

3. The auto clean machine of claim 1, wherein the light region comprises a first light region and a second light region perpendicular to the first light region, wherein the processor generates the wall detection result according to a ratio between a length of the first light region and a length of the second light region.

4. The auto clean machine of claim 1, wherein the processor generates an object height detection result based on the first brightness distribution of the light region, and controls the movement of the auto clean machine according to the object height detection result.

5. The auto clean machine of claim 4,
   wherein the light region comprises a first light region, a second light region perpendicular to an extension region of the first light region, and a third light region, wherein the third light region is parallel with the extension region of the first light region;
   wherein the processor generates the object height detection result according to a length of the third light region.

6. The auto clean machine of claim 4,
   wherein the light region comprises a first light region, a second light region perpendicular to an extension region of the first light region;
   wherein the processor generates the object height detection result according to a length for a dark region between the second light region and the first light region.

7. The auto clean machine of claim 1, wherein the processor generates the cliff detection result according to a length of the light region.

8. The auto clean machine of claim 1, wherein the light source is a line light source.

9. An auto clean machine control method, comprising:
   emitting light to illuminate at least one light region;
   sensing a first brightness distribution of the light region by a first image sensing area, wherein a resolution for a horizontal direction of the first image sensing area is higher than a resolution for a vertical direction of the first image sensing area;
   sensing a second brightness distribution of the light region by a second image sensing area below the first image sensing area, wherein a resolution for a vertical direction of the second image sensing area is higher than a resolution for a horizontal direction of the second image sensing area;
   controlling movement of the auto clean machine according the first brightness distribution and the second brightness distribution;
   generating a wall detection result based on the first brightness distribution of the light region;
   generating a cliff detection result based on the second brightness distribution of the light region; and
   controlling the movement of the auto clean machine according to the wall detection result and the cliff detection result.

10. The auto clean machine control method of claim 9, wherein the first brightness distribution is a length of the light region or an image centroid of the light region.

11. The auto clean machine control method of claim 9, wherein the light region comprises a first light region and a second light region perpendicular to the first light region, wherein the auto clean machine control method further comprises:
   generating the wall detection result according to a ratio between a length of the first light region and a length of the second light region.

12. The auto clean machine control method of claim 9, further comprising:
   generating an object height detection result based on the first brightness distribution of the light region; and
   controlling the movement of the auto clean machine according to the object height detection result.

* * * * *